(12) United States Patent
Wehrung et al.

(10) Patent No.: US 10,887,549 B1
(45) Date of Patent: Jan. 5, 2021

(54) SYNCHRONIZED VIEWING OF SHARED CONTENT

(71) Applicant: Fuze, Inc., Boston, MA (US)

(72) Inventors: Clement Wehrung, Paris (FR); Jedidiah Brown, Seattle, WA (US)

(73) Assignee: Fuze, Inc., Boston, MA (US)

( * ) Notice: Subject to any disclaimer, the term of this patent is extended or adjusted under 35 U.S.C. 154(b) by 0 days.

(21) Appl. No.: 16/268,068

(22) Filed: Feb. 5, 2019

(51) Int. Cl.
*H04N 7/15* (2006.01)
*H04L 29/08* (2006.01)

(52) U.S. Cl.
CPC .......... *H04N 7/15* (2013.01); *H04L 67/1095* (2013.01); *H04L 67/1097* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0166952 A1* | 6/2012 | Alexandrov | ......... | G06Q 10/101 715/730 |
| 2012/0233532 A1* | 9/2012 | Rickabaugh | ............ | G06F 40/14 715/209 |
| 2015/0213149 A1* | 7/2015 | Halevi | .................. | G06F 17/243 715/753 |
| 2016/0148522 A1* | 5/2016 | Rowland | .................. | G09B 5/14 434/362 |
| 2016/0180743 A1* | 6/2016 | Ahmad | ............... | G06F 19/3418 434/262 |
| 2018/0077449 A1* | 3/2018 | Herz | .................... | H04N 21/436 |
| 2019/0052473 A1* | 2/2019 | Soni | .................... | H04L 12/1827 |
| 2019/0179499 A1* | 6/2019 | Matthew | ................. | G06T 17/00 |

* cited by examiner

*Primary Examiner* — Phung-Hoang J Nguyen
(74) *Attorney, Agent, or Firm* — McDermott Will & Emery LLP

(57) ABSTRACT

A system may send content to be shared in an online meeting between a plurality of computing devices to each of the plurality of computing devices. The system may receive, from a computing device associated with a presenter role in the online meeting from the plurality of computing devices, indications of interactions with the content. The system may, in response to receiving the indications of the interactions, send one or more commands to each of the plurality of computing devices other than the computing device to synchronize presentation of the content at each of the plurality of computing devices other than the computing device according to the interactions with the content by the computing device.

18 Claims, 8 Drawing Sheets

SYNCHRONIZED VIEWING OF SHARED CONTENT

TECHNICAL FIELD

The present disclosure generally relates to an online meeting system, and more specifically relates to synchronized viewing of shared content during an online meeting.

BACKGROUND

An online meeting system may enable a group of participants to conduct an online meeting, such as a teleconference and/or video conference, via computing devices that communicate with the online meeting system over a network. During the online meeting, a presenter may enable screen sharing functionality to present content displayed by the presenter's computing device.

The description provided in the background section should not be assumed to be prior art merely because it is mentioned in or associated with the background section. The background section may include information that describes one or more aspects of the subject technology.

SUMMARY

The disclosed system provides for synchronized viewing of shared content during an online meeting without the use of screen sharing functionality. Instead of using screen sharing functionality, the disclosed system may convert content that is to be shared during the online meeting to a format that is optimized for sharing during the online meeting, and may send the content in the converted format to each of the computing devices used by participants of the online meeting. As a presenter of the online meeting navigates, annotates, or otherwise interacts with the content, the system may send indications of the presenter's interactions to the computing devices used by the other participants of the online meeting so that the computing devices may update their presentation of the content according to the presenter's interactions with the content, thereby syncing the view of the shared content between all of the participants of the online meeting according to the presenter's interactions with the content.

According to certain aspects of the present disclosure, a method is provided. The method includes sending content to be shared in an online meeting between a plurality of computing devices to each of the plurality of computing devices. The method further includes receiving, from a computing device associated with a presenter role in the online meeting from the plurality of computing devices, indications of interactions with the content. The method further includes in response to receiving the indications of the interactions, sending one or more commands to each of the plurality of computing devices other than the computing device to synchronize presentation of the content at each of the plurality of computing devices other than the computing device according to the interactions with the content by the computing device.

According to certain aspects of the present disclosure, a system is provided. The system includes a memory comprising content to be shared in an online meeting between a plurality of computing devices. The apparatus further includes a processor configured to execute instructions which, when executed, cause the processor to: send the content to each of the plurality of computing devices; receiving, from a computing device associated with a presenter role in the online meeting from the plurality of computing devices, indications of interactions with the content; and in response to receiving the indications of the interactions, sending one or more commands to each of the plurality of computing devices other than the computing device to synchronize presentation of the content at each of the plurality of computing devices other than the computing device according to the interactions with the content by the computing device.

According to certain aspects of the present disclosure, an apparatus is provided. The apparatus includes means for sending content to be shared in an online meeting between a plurality of computing devices to each of the plurality of computing devices. The apparatus further includes means for receiving, from a computing device associated with a presenter role in the online meeting from the plurality of computing devices, indications of interactions with the content. The apparatus further includes means for, in response to receiving the indications of the interactions, sending one or more commands to each of the plurality of computing devices other than the computing device to synchronize presentation of the content at each of the plurality of computing devices other than the computing device according to the interactions with the content by the computing device.

According to certain aspects of the present disclosure, a non-transitory machine-readable storage medium is provided. The non-transitory machine-readable storage medium comprises machine-readable instructions for causing a processor to execute a method for sharing content in an online meeting. The method includes sending content to be shared in an online meeting between a plurality of computing devices to each of the plurality of computing devices. The method further includes receiving, from a computing device associated with a presenter role in the online meeting from the plurality of computing devices, indications of interactions with the content. The method further includes in response to receiving the indications of the interactions, sending one or more commands to each of the plurality of computing devices other than the computing device to synchronize presentation of the content at each of the plurality of computing devices other than the computing device according to the interactions with the content by the computing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
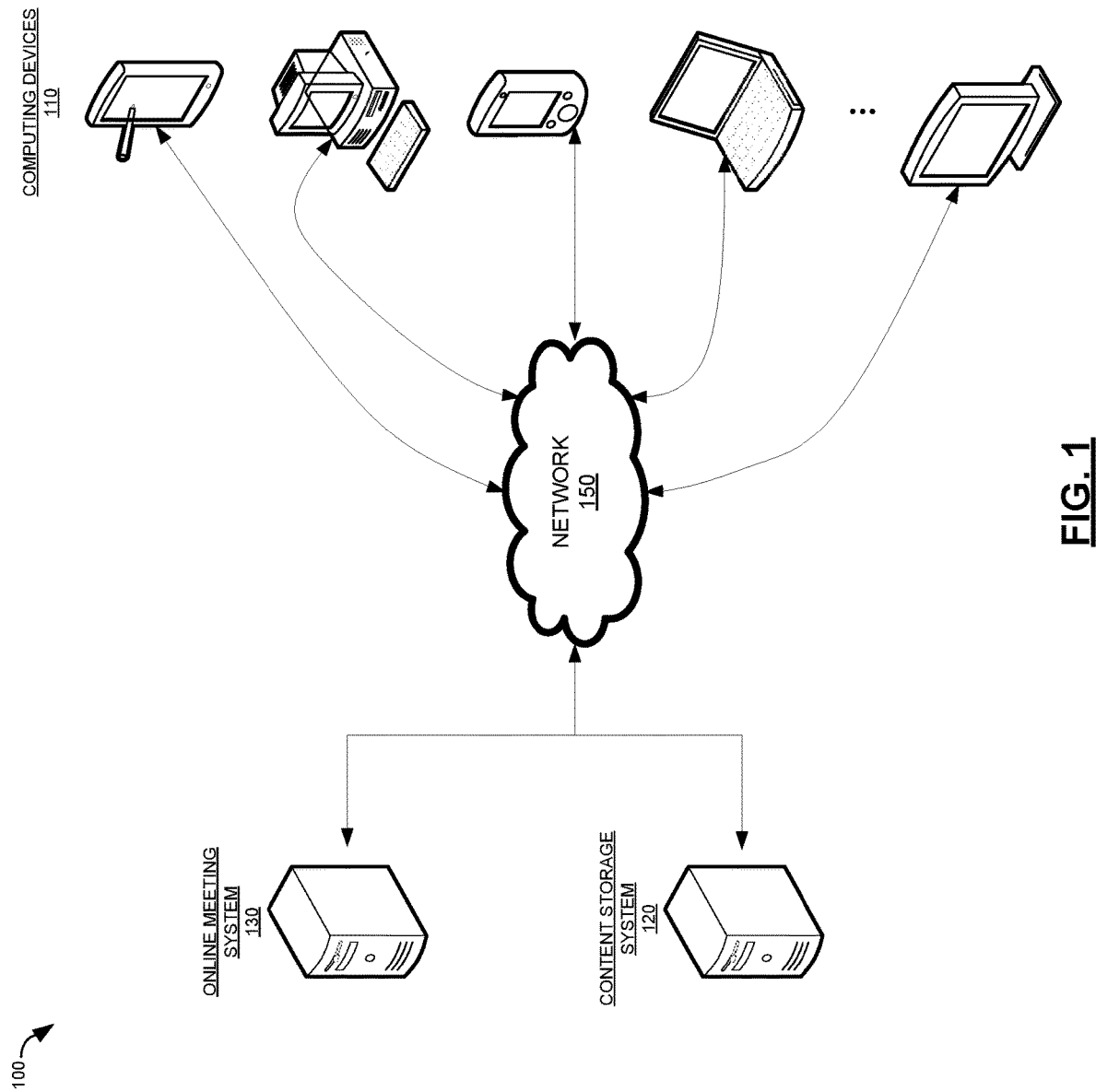
FIG. 1 illustrates an example architecture for sharing content in an online meeting.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for synchronized viewing of shared content during an online meeting without the use of screen sharing functionality. The disclosed system may send a copy of the content to be shared during an online meeting to each of the computing devices participating in the online meeting, and each computing device may open up and present their own copy of the content. During the online meeting, a computing device may present the content by interacting with the content to navigate the content, mark up the content, and the like. The disclosed system may send one or more commands to the other computing devices taking part in the online meeting to sync the presentation of the content at the other computing devices according to the interactions with the content by the computing device. The disclosed system thereby synchronizes the presentation of the content across each of the computing devices taking part in the online meeting.

The disclosed system addresses a technical problem tied to computer technology and arising in the realm of computer networks, namely the technical problem of the amount of bandwidth of the computer network used to share content in an online meeting system. One technique for sharing content in an online meeting is screen sharing, where the graphical user interface output by a presenting computing device is shared with the other computing devices taking part in the online meeting. However, screen sharing may require continual use of a relatively high amount bandwidth during the online meeting to continually share and update the graphical user interface output by the presenting computing device with the other computing devices taking part in the online meeting. Further, the quality of such screen sharing may depend upon the available bandwidth throughout the online meeting, such that a drop in available bandwidth may lead to a decrease in the visual quality of such screen sharing.

In contrast to the technique of screen sharing, the disclosed system addresses the technical problem of the amount of bandwidth used to share content in an online meeting by sending a copy of the content to be shared to each of the computing devices taking part in the online meeting. By converting the content to be shared to a format that is optimized for sharing, the disclosed system may reduce the amount of bandwidth used to send the content to each of the computing device taking part in the online meeting.

Further, once the content has been received by each of the computing devices taking part in the online meeting, the disclosed system may consume a reduced amount of bandwidth to present the content in the online meeting compared with screen sharing. The disclosed system may send commands or instructions to sync the presentation of the content at the computing devices taking part in the meeting, which may consume significantly less bandwidth compared with sending a representation of a graphical user interface, such as in the case of techniques for screen sharing.

In addition, because the disclosed system sends a copy of the content to each of the computing devices taking part in the online meeting, the visual quality of the content is not affected by changes in the available bandwidth in the network. This is in contrast to screen sharing, where the visual quality of a representation of a graphical user interface that is being shared may depend upon the available bandwidth throughout the online meeting, such that a drop in available bandwidth may lead to a decrease in the visual quality of the shared representation of the graphical user interface.

The disclosed system further addresses a technical problem tied to computer technology, namely the technical problem of reducing the amount of processing power used by computing devices to share content in an online meeting. In techniques such as screen sharing, where a representation of a graphical user interface is shared amongst computing devices taking part in an online meeting, a relatively high amount of computing resources may be required for each of the computing devices taking part in the online meeting render the representation of the graphical user interface.

In contrast, the disclosed system solves the technical problem of reducing the amount of processing power used by computing devices to share content in an online meeting by converting the content to be shared in an online meeting to a format that is optimized for sharing and by sending a copy of the content in the optimized format to each of the computing devices. The format that is optimized for sharing may be a vector-based format, which may require a relatively lower amount of computing resources to render compared with rendering a bitmap of a representation of a graphical user interface, such as in the case of screen sharing.

The disclosed system also provides additional advantages compared with other techniques for sharing content in an online meeting. In techniques such as screen sharing, an online meeting may be limited to having a single presenter, which is the computing device that is sharing a representation of its graphical user interface. In contrast, the disclosed system is not so limited. The disclosed system may enable an online meeting to have any number of presenters, and may assign different presenters to present different portions of the content being shared in the online meeting. Further, participants in the online meeting that are not presenters may be able to browse through, navigate through, or otherwise interact with their own copies of the content without affecting the presentation of the content by presenters in the online meeting. In this way, the disclosed system is also directed to an improvement to computer functionality of computing devices taking part in an online meeting.

Example System Architecture

FIG. 1 illustrates an example architecture for sharing content in an online meeting. As shown in FIG. 1, architecture 100 includes computing devices 110, content storage system 120, and online meeting system 130 that are connected via network 150 during the course of an online meeting.

FIG. 1 illustrates an example architecture for sharing content in an online meeting. As shown in FIG. 1, architecture 100 includes computing devices 110, content storage system 120, and online meeting system 130 that are connected via network 150 during the course of an online meeting.

Online meeting system 130 may include one or more servers having appropriate processors, memories, and communications capabilities for hosting an online meeting between computing devices 110. In certain aspects, online meeting system 130 can be a cloud computing server of an infrastructure-as-a-service (IaaS) and be able to support a platform-as-a-service (PaaS) and software-as-a-service (SaaS) services.

Computing devices 110 may be two or more computing devices that take part in an online meeting and may include, for example, any combinations of desktop computers, mobile computers, tablet computers (e.g., including e-book readers), mobile devices (e.g., a smartphone or PDA), set top boxes (e.g., for a television), video game consoles, and/or any other devices having appropriate processor, memory, and communications capabilities.

Content storage system 120 may be any suitable storage system for storing content that may be accessed and shared by online meeting system 130 during an online meeting. Content storage system 120, for example, may include one or more servers having appropriate processors, memories, and communications capabilities for storing content and communicating the content to online meeting system 130 and/or computing devices 110. The one or more servers may provide cloud storage services for storing content, such that content storage system 120 may be a cloud storage system.

Network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Online meeting system 130 may be configured to facilitate an online meeting between users of computing devices 110. An online meeting may be a communications session between users of computing devices 110, such as a video conference session, a teleconference session, and the like. Online meeting system 130 may be configured to send and receive data, including audio and/or video data, to and from participant computing devices 110 in order to facilitate the online meeting between participant computing devices 110, so that users of participant computing devices 110 may communicate with each other via audio and/or video during the online meeting. Thus, online meeting system 130 can be referred to as being the "host" or "hosting" the online meeting between computing devices 110. In this way, online meeting system 130 may enable users of participant computing devices 110 to conduct a teleconference, a video conference, or any other form of an audio and/or visual communications during an online meeting.

Online meeting system 130 may also be configured to enable computing devices 110 of an online meeting to present, share, view, or collaboratively edit content during the online meeting without the use of screen sharing. Such content may include any suitable electronic document and/or file, including but not limited to electronic text documents, spreadsheets, slide decks, audio files, video files, and the like. Online meeting system 130 may be configured to receive an indication of the content that is to be shared in the online meeting, retrieve the content from content storage system 120, and send the content to each of computing devices 110. Thus, each one of computing devices 110 may receive a copy of the content that is shared in the online meeting, and may output their copy of the content for viewing by users of computing devices 110.

Online meeting system 130 may be configured to enable one or more computing devices from computing devices 110 to control presentation of the content shared in the online meeting. Online meeting system 130 may be configured to associate a presenter role with one or more computing devices from computing devices 110, so that a computing device associated with the presenter role may control the presentation of the content shared in the online meeting by each of computing devices 110.

A computing device associated with a presenter role may be configured to control the presentation of the content shared in the online meeting by interacting with the content. The computing device may receive user input and may interact with the content according to the user input. Interacting with the content includes navigating through portions of the content to determine a portion of the content that is output by the computing device for display at a display device. For example, the computing device may scroll through a word processing document to navigate to a page of the word processing document that is output by the computing device, or may navigate through a slide deck to navigate to a slide of the slide deck that is output by the computing device. Interacting with the content may also include marking up or annotating the portion of the content being output by the computing device for display at a display device.

As the computing device associated with the presenter role interacts with the content to navigate through or markup portions of the content, the computing device may send indications of such interactions to online meeting system 130 so that online meeting system 130 may synchronize the presentation of the content at the other computing devices in computing devices 110 with the interactions by the computing device associated with the presenter role. For example, when the computing device associated with the presenter role navigates through the content to cause a new portion of the content to be output by the computing device, the computing device may send an indication of the new portion of the content to online meeting system 130. In response, online meeting system 130 may send one or more commands to each of the other computing devices in computing devices 110 to direct each of those computing devices to output the new portion of the content. Similarly, when the computing device associated with the presenter role marks up a portion of the content, the computing device may send an indication of the mark up to online meeting system 130. In response, online meeting system 130 may send one or more commands to each of the other computing devices in computing devices 110 to direct each of those computing devices to output the mark up of the portion of the content.

Example Online Meeting System and Example Computing Devices

Figure 2:
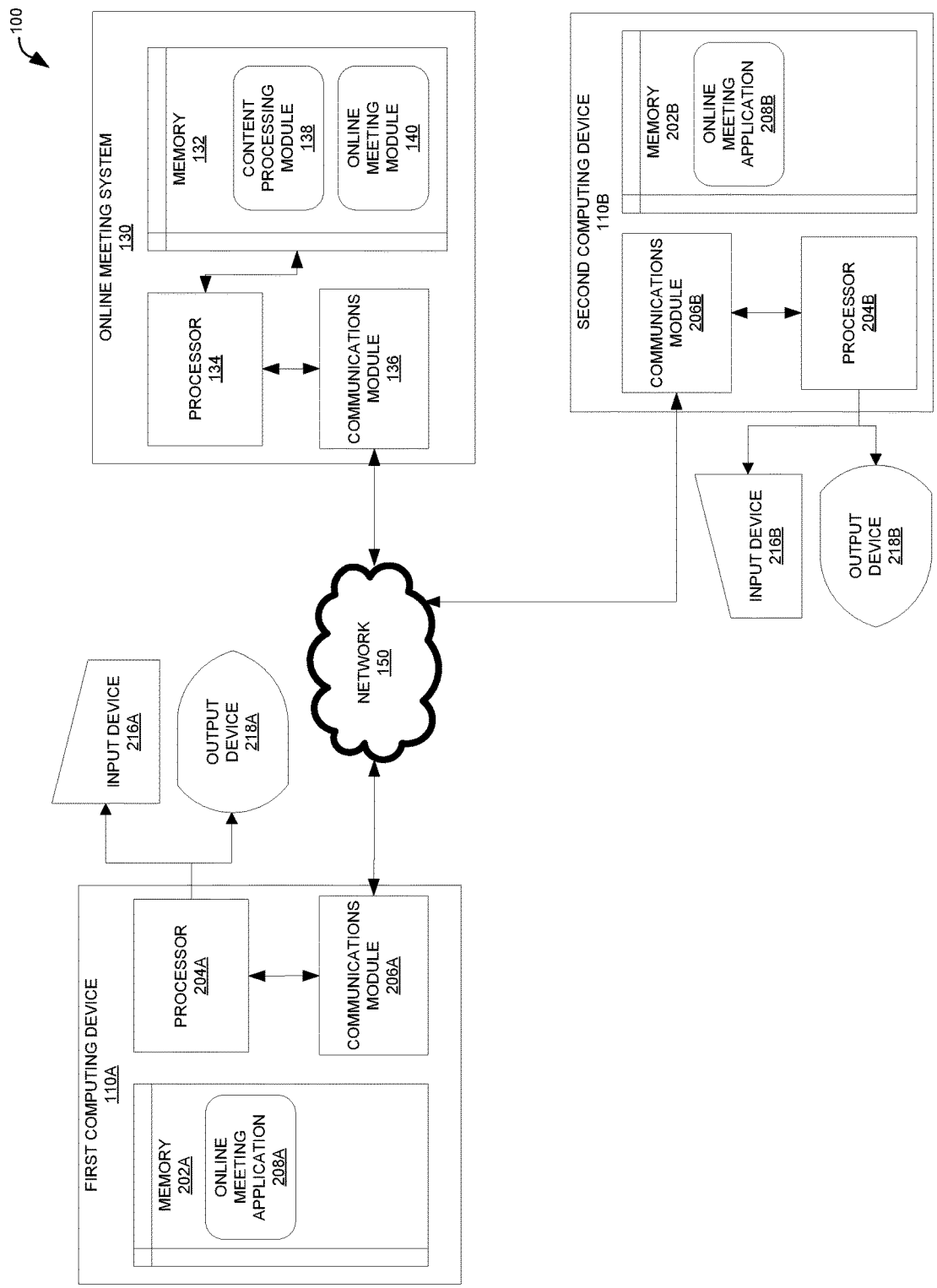
FIG. 2 is a block diagram illustrating the example computing devices and the example online meeting system from the architecture of FIG. 1 according to certain aspects of the disclosure.

FIG. 2 is a block diagram illustrating the example computing devices and the example online meeting system from the architecture of FIG. 1 according to certain aspects of the disclosure. As shown in FIG. 2, online meeting system 130 is connected with computing devices 110A and 110B via network 150 in architecture 100 and is configured to host an online meeting between computing devices 110A and 110B. Computing devices 110A and 110B are examples of computing devices 110 of FIG. 1 that take part in an online meeting hosted by online meeting system 130. While FIG. 2 illustrates an example of an online meeting between two computing devices: computing devices 110A and 110B, online meeting system 130 as described throughout this disclosure may host online meetings between any number of two or more computing devices, such as two computing devices, three computing devices, five computing devices, and the like.

Online meeting system 130, computing device 110A, and computing device 110B are connected over the network 150 via respective communications modules 136, 206A, and 206B. The communications modules 136, 206A, and 206B are configured to interface with the network 150 to send and receive information, such as data, content, requests, responses, and commands to other devices on the network. The communications modules 136, 206A, and 206B can be, for example, modems, wireless fidelity (Wi-Fi) interfaces, or Ethernet cards.

Online meeting system 130 includes processor 134, communications module 136, and memory 132 that includes content processing module 138 and online meeting module 140. Processor 134 of online meeting system 130 is configured to execute instructions, such as instructions physically coded into the processor 134, instructions received from software in memory 132, or a combination of both. For example, the processor 134 of online meeting system 130 executes instructions of online meeting module 140 to host an online meeting between two or more computing devices, such as computing device 110A and computing device 110B. The computing devices taking part in an online meeting may be referred to throughout this disclosure as participant computing devices. Thus, computing devices 110A and computing device 110B taking part in an online meeting with each other may each be referred to as a participant computing device.

Computing device 110A includes processor 204A, communications module 206A, and memory 202A. Memory 202A includes online meeting application 208A. Computing device 110A also includes input device 216A, such as a keyboard, a mouse, a presence-sensitive display, a microphone, and the like, and output device 218A, such as a display device, speakers, and the like. Processor 212A of computing device 110A is configured to execute instructions, such as instructions physically coded into processor 204A, instructions received from software in memory 202A, or a combination of both. For example, processor 204A of computing device 110A executes instructions of online meeting application 208A to cause processor 204A to perform the functions of online meeting application 208A.

The functions of online meeting application 208A include communicating with online meeting module 140 of online meeting system 130 to start, join, and/or exit an online meeting between computing devices 110A and 110B, as well as to exchange data with online meeting module 140 during the course of an online meeting. During the online meeting, online meeting application 208A may receive audio and/or video data from online meeting module 140 and may output the received audio and/or video data via output device 218A. During the online meeting, online meeting application 208A may also receive audio input and/or video input via input device 216A and may send audio data and/or video data associated with the audio input and/or video input to online meeting module 140. The sending and receiving of audio data and/or video data enables online meeting application 208A to perform the functions of a teleconferencing application or a video conferencing application.

Computing device 110B includes processor 204B, communications module 206B, and memory 202B. Memory 202B includes online meeting application 208B. Computing device 110B also includes input device 216B, such as a keyboard, a mouse, a presence-sensitive display, a microphone, and the like, and output device 218B, such as a display device, speakers, and the like. Processor 212B of computing device 110B is configured to execute instructions, such as instructions physically coded into processor 204B, instructions received from software in memory 202B, or a combination of both. For example, processor 204B of computing device 110B executes instructions of online meeting application 208B to cause processor 204B to perform the functions of online meeting application 208B.

The functions of online meeting application 208B include communicating with online meeting module 140 of online meeting system 130 to start, join, and/or exit an online meeting between computing devices 110A and 110B, as well as to exchange data with online meeting module 140 during the course of an online meeting. During the online meeting, online meeting application 208B may receive audio and/or video data from online meeting module 140 and may output the received audio and/or video data via output device 218B. During the online meeting, online meeting application 208B may also receive audio input and/or video input via input device 216B and may send audio data and/or video data associated with the audio input and/or video input to online meeting module 140. The sending and receiving of audio data and/or video data enables online meeting application 208B to perform the functions of a teleconferencing application or a video conferencing application.

Computing devices may communicate with online meeting system 130 to start and/or join an online meeting between the computing devices. In the example of FIG. 2, online meeting applications 208A and 208B at computing devices 110A and 110B may communicate with online meeting module 140 at online meeting system 130 to start and/or join an online meeting between computing devices 110A and 110B. For example, online meeting applications 208A and 208B may each access a specific universal resource location (URL) associated with an online meeting to start and/or join the online meeting. Once online meeting applications 208A and 208B have started and joined the online meeting, users of computing devices 110A and 110B may use online meeting applications 208A and 208B communicate with each other via audio and/or video to teleconference or videoconference with each other during the online meeting.

During the course of the online meeting, as users of computing devices 110A and 110B communicate via the teleconferencing or audio conferencing functionalities provided by online meeting applications 208A and 208B, online meeting applications 208A and 208B may also include functionality that enable the users of computing devices 110A and 110B to present, view, or otherwise share content amongst computing devices 110A and 110B in the online meeting without the use of screen sharing functionality.

Such content that may be shared during the online meeting may include any suitable electronic file or document, such as a slide deck, text documents, word processing documents, spreadsheets, image files, video files, and the like.

To share content during an online meeting, a computing device taking part in the online meeting may send an indication of the content to be shared to online meeting system 130. For example, online meeting application 208A of computing device 110A may send an indication of the content to be shared to online meeting module 140. Such an indication of the content to be shared may be a copy of the content itself, an indication of the location of the content in content storage system 120, an indication of the location of the content in network 150 (e.g., the Internet), and the like. For example, the user of computing device 110A may interact with online meeting application 208A to browse the file system of computing device 110A to select a file stored in memory 202A that computing device 110A may send to online meeting system 130 via network 150. In another example, the user of computing device 110A may interact with online meeting application 208A to browse content storage system 120 to select a file stored in content storage system 120, and computing device 110A may send an indication of the location of the file in content storage system 120, such as the universal resource locator (URL) associated with the selected file, to online meeting system 130 via network 150.

Online meeting module 140 of online meeting system 130 may receive the indication of the content to be shared from computing device 110A and may, in response, retrieve the content to be shared based at least in part on the indication of the content if the indication of the content did not include the content itself. For example, if online meeting module 140 of online meeting system 130 receives an indication of the location of content in content storage system 120, online meeting module 140 may retrieve the content from the indicated location in content storage system 120. In examples where content storage system 120 is a third-party cloud storage provider, online meeting module 140 may deeply integrate itself with the third-party cloud storage provider, such as via application programming interfaces (APIs) associated with the third-party cloud storage provider to provide an interface that enables the user of computing device 110A to use online meeting application 208A to browse content storage system 120 to select the content.

In response to obtaining the content to be shared, content processing module 138 of online meeting system 130 may execute at processor 134 to convert the content to be shared into a form that is optimized for sharing in an online meeting. Converting the content to be shared into a form that is optimized for sharing in an online meeting includes converting the content that is obtained in a first format from the first format into a second format that is optimized for sharing in an online meeting. A file format that is optimized for sharing may be a file format that is relatively faster to send over a network or may be relatively faster for a computing device to render to output the content for display at a display device.

For example, the second format may be a compressed format, and content processing module 138 may execute to convert the content from the first format to the second format by compressing the content, thereby reducing the amount of bandwidth used and decrease the amount of time taken to send the content via network 150 to computing devices that take part in the meeting. In another example, the second format may be a vector-based format because a computing device may be able to more efficiently render content that is in the vector format to output for display at a display device compared with other non-vector file formats such as a bitmap format. Thus, content processing module 138 may execute to convert the content from the first format to the vector-based format.

Content processing module 138 may further execute to modify the content that is sent to one or more of computing devices taking part in the online meeting. For example, content processing module 138 may translate the content from a first language to a second language, such as from French to English. Online meeting system 130 may receive an indication of a preferred language for a computing device taking part in an online meeting and may, in response, content processing module 138 may translate content to be shared in the online meeting to the preferred language for the computing device to generate a translated version of the content that is to be sent to the computing device.

For example, if online meeting system 130 receives an indication that computing device 110A has a preferred language of French, and if the content to be shared is a document in Spanish, content processing module 138 may translate the content from Spanish to French to generate a translated version of the content, and online meeting system 130 may send the translated version of the content to computing device 110A. Meanwhile, if online meeting system 130 does not receive an indication that computing device 110B has a preferred language, online meeting system may send the untranslated version of the content to computing device 110A. In this way, the user of computing device 110A may view the contents at computing device 110A in French, while the user of computing device 110B may view the contents at computing device 110B in Spanish.

Regardless of whether content processing module 138 converts the content to be shared into a form that is optimized for sharing, or whether content processing module 138 modifies the content to be shared, online meeting system 130 may execute to send, via communications module 136 over network 150, the content to be shared to each of the computing devices taking part in the online meeting. In this way, each computing device taking part in an online meeting receives a copy of the content that is to be shared during the online meeting. In the example of FIG. 2, online meeting system 130 may send the content to computing devices 110A and 110B because computing devices 110A and 110B are the two computing devices taking part in the online meeting.

Computing devices 110A and 110B may each receive the content to be shared from online meeting system 130, and online meeting applications 208A and 208B may each open the content received from online meeting system 130 and may output a visual representation of the content for display at output devices 218A and 218B, so that users of computing devices 110A and 110B may view the contents during the online meeting. In this way, each computing device taking part in an online meeting may receive a copy of the content being shared and may output a visual representation of the content for display at respective output devices. Because each computing device in an online meeting receives its own copy of the content to be shared, each computing device may browse and interact with its copy of the content independently from the other computing devices in the online meeting.

Online meeting system 130 may also enable one or more computing devices taking part in an online meeting to act as presenters of the content being shared in the online meeting to control the presentation of the content by the computing devices taking part in the online meeting. Online meeting module 140 may associate one or more computing devices of the online meeting with a presenter role to enable the one or more computing devices to act as presenters of the content being shared in the online meeting. When a computing device is associated with the presenter role, any changes to the made visual presentation of the content at the computing device may be reflected at every computing device at each of the computing devices taking part in the online meeting, so that the visual presentation of the content at computing devices taking part in the meeting are synced to the visual presentation of the content at the computing device.

Online meeting system 130 may determine which of the computing devices taking part in the online meeting to associate with a presenter role in an online meeting in any suitable fashion. For example, the online meeting may specify one or more computing devices as being associated with the presenter role during the meeting. In another example, the content being shared may specify one or more computing devices as being associated with the presenter role for the content. Online meeting system 130 may associate the presenter role with more than one computing device taking part in an online meeting. For example, online meeting module 140 may associate two or more computing devices with the presenter role in an online meeting, so that the two or more computing devices may be able to control presentation of content in the online meeting at the same time A computing device associated with a presenter role may control the presentation of the content shared in an online meeting by navigating through, marking up, or otherwise interacting with the content that is shared in the online meeting. Online meeting system 130 may receive such indications of the interactions of the computing device and may sync the presentation of the content by the computing devices taking part in the online meeting according to the computing device's interactions.

Navigating through the content may include changing the portion of the content that is presented by the computing device from a first portion of the content to a second portion of the content. For example, when the content is a word processing document, navigating through the content may include scrolling the document to change the page of the word processing document that is output by the computing device from a first page to a second page. In another example, when the content is a slide deck, navigating through the content may include advancing the slide deck to change the slide of the slide deck that is output by the computing device. Marking up the content that is shared in the online meeting may include marking up the portion of the content that is presented by the computing device, such as drawing on the portion of the content that is output by the computing device, pointing at a specific part of the portion of the content that is output by the computing device, highlighting a specific area of the portion of the content that is output by the computing device, inserting textual annotations in the portion of the content that is output by the computing device, and the like.

In the example of FIG. 2, online meeting module 140 may enable computing device 110A to be a presenting computing device that acts as a presenter in the online meeting between computing devices 110A and 110B. Computing device 110A may output the content for display at output device 218A and may enable a user to interact with the content via input device 216A to affect the presentation of the content is presented at not only computing device 110A but also every other computing device (e.g., computing device 110B) taking part in the online meeting. The user may provide input to interact with the content to change the portion of content that is displayed at output device 218A. For example, if the content is a slide deck, the user may provide input via input device 216A to advance the slide deck so that a particular slide of the slide deck is output for display at output device 218A. In another example, if the content is a word processing document, the user may provide input via input device 216A to scroll through the document so that a particular page of the document is output for display at output device 218A. In this way, the user may provide input via input device 216A to navigate the content so that computing device 110A outputs a specific part or portion of the content for display at output device 218A.

The user of computing device 110A may also provide input to interact with the content to markup or annotate the content. For example, the user may provide input to select a markup tool or annotation tool provided by online meeting application 208A, and to use the selected tool to mark up and annotate the portion of the content output by online meeting application 208A for display at output device 218A, such as by drawing on portions of the content, highlighting words in the content, and the like.

When a computing device associated with a presenter role interacts with the content that is shared in the online meeting, the computing device may send indications of such interactions with the content to online meeting system 130. For example, when the interactions includes navigating the content from a first portion of the content that is output by the computing device to a second portion of content that is output by the computing device, the indications of the interactions with the content may include an indication of the second portion of the content to which the computing device has navigated. Thus, if the interactions includes navigating a document from a first page to a second page that is output by the computing device, the indications of the interactions with the document may include an indication of the second page to which the computing device has navigated. When the interactions includes marking up the content, the indications of the interactions with the content may include an indication of the mark ups made to the content, such as indications the markup tool used to mark up the content, indications of the locations of the content that were marked up, the indications of how the content was marked up, and the like.

Online meeting system 130 may receive from the computing device associated with the presenter role, the indications of interactions with the content, and may, in response, formulate one or more commands based at least in part on the interactions with the content, and send the one or more commands to each of the computing devices taking part in the online meeting other than the computing device associated with the presenter role, to synchronize presentation of the content at each of the computing devices taking part in the online meeting other than the computing device associated with the presenter role according to the interactions with the content by the computing device associated with the presenter role. The one or more commands In the example of FIG. 2, as computing device 110A receives user input to interact with the content as described above, online meeting application 208A may send, via communications module 206A, indications of the interactions with the content to online meeting system 130 to update the presentation of the content at each of the other computing devices in the online meeting. Online meeting system 130 may receive, via communications module 136, the indications of interactions with the content from computing device 110A, and online meeting module 140 may formulate one or more commands based at least in part on the indications of interactions with the content received from computing device 110A that are to be sent to computing device 110B.

The one or more commands formulated by online meeting module 140 may enable online meeting module 140 to synchronize the presentation of the content across every computing device in the online meeting based on the interactions of the computing device associated with the presenter role with the content. Thus, when the computing device associated with the presenter role interacts with the content to navigate from presenting a first portion of the content to presenting a second portion of the content, such that the second portion of the content is output by the computing device with the presenter role, online meeting module 140 may formulate one or more commands to present the second portion of the content. Similarly, when the computing device associated with the presenter role marks up a portion of the content, online meeting module 140 may formulate one or more commands to mark up the portion of the content.

In the example of FIG. 2, online meeting module 140 may formulate one or more commands to direct computing device 110B to synchronize its presentation of the content with the presentation of the content by computing device 110A. In particular, the one or more commands may direct computing device 110B to update its presentation of the content to correspond to the presentation of the content at computing device 110A as a result of computing device 110A's interactions with the content.

For example, if the indications of interactions with the content received from computing device 110 includes an indication that online meeting application 208A has navigated to a particular portion of the content, the one or more commands may include a command for computing device 110B to navigate to the same particular portion of content to which online meeting application 208A has navigated. In another example, if the indications of interactions with the content received from computing device 110 includes an indication that online meeting application 208A has marked up a particular portion of the content, the one or more commands may include a command for computing device 110B to mark up the particular portion of content that was marked up by online meeting application 208A.

Online meeting system 130 may send the one or more commands to each of the participant computing devices of the online meeting other than computing device 110A. In the example of FIG. 2, because the online meeting is between computing devices 110A and 110B, online meeting system 130 may send the one or more commands via communications module 136 to computing device 110B.

Each participant computing device of an online meeting that receives the one or more commands from online meeting system 130 may update its presentation of the content being shared in the online meeting based at least in part on the one or more commands. In the example of FIG. 2, computing device 110B may receive the one or more commands and may update its presentation of the content based on the one or more commands. For example, if the one or more commands direct computing device 110B to present a specified portion of the content, online meeting application 208B may execute at processor 204B to present the specified portion of the content by outputting the specified portion of the content for display at output device 218B. In another example, if the one or more commands direct computing device 110B to mark up a specified portion of the content, online meeting application 208B may execute at processor 204B to mark up the specified portion of the content and to present the marked up portion of the content by outputting the marked up portion of the content for display at output device 218B.

In an online meeting, computing devices that are not associated with a presenter role may be able to interact with their local copy of the content independently from the presentation of the content by a computing device associated with the presenter role. In the example of FIG. 2, when computing device 110A is associated with the presenter role and computing device 110B is not associated with the presenter role, computing device 110B may independently interact with the copy of content received by computing device 110B regardless of computing device 110A's interactions with the content. For example, computing device 110B may navigate the content (e.g., scroll through the content) from the portion currently being presented in the online meeting to a different portion of the content in order to view other portions of the content different from what is currently being presented in the online meeting.

In some examples, content shared during the online meeting may specify different computing devices as presenters for different portions of the content, such that the content may specify a first computing device as the presenter for a first portion of the content and may specify a second computing device as the presenter for a second portion of the content. During the online meeting, when the first portion of the content is being presented, online meeting module 140 may determine that the content specifies a first computing device as the presenter for the first content, and may, in response, associate the first computing device with the presenter role. As the first computing device associated with the presenter role navigates the content, the portion of the content being presented in the online meeting may transition from the first portion of the content being presented in the online meeting to the second portion of the content being presented in the meeting. If online meeting module 140 determines that the content specifies a second computing device as being associated with the presenter role for the second content, online meeting module 140 may, in response, associate the second computing device with the presenter role.

In the example of FIG. 2, a first portion of the content may specify computing device 110A as the presenter for the first portion of the content, and a second portion of the content may specify computing device 110B as the presenter for the second portion of the content. When computing device 110A navigates the content to transition from the first portion of the content being presented in the online meeting to the second portion of content being presented in the online meeting, computing device 110A may send to online meeting system 130 an indication that it has navigated the content to the second portion of the content. Online meeting module 140 may determine that there has been a transition from the first portion of the content being presented in the online meeting to the second portion of content being presented in the online meeting based on the indication of computing device 110A's navigation of the content and may, in response and based on the content, determine that computing device 110B is associated with the presenter role for presenting the second portion of the content.

Being associated with the presenter role may enable computing device 110B to control the presentation of the content in a way that is similar to what is described above with respect to computing device 110B. For example, computing device 110B may interact with the second portion of the content for which it is associated with the presenter role to navigate through the second portion of the content and/or mark up the second portion of the content. Computing device 110B may send an indication of its interactions with the second portion of the content to online meeting system 130. Online meeting module 140 may receive the indications of computing device 110B's interactions and may, in response formulate one or more commands to synchronize presentation of the content according to the interactions with the content by computing device 110B. Online meeting module 140 may send the one or more commands to each of the computing devices taking part in the online meeting other than computing device 110B to synchronize presentation of the content at each of the computing devices other than computing device 110B according to the interactions with the content by computing device 110B. In the example of FIG. 2, because the online meeting is between computing devices 110A and 110B, online meeting module 140 may send the one or more commands to computing device 110A.

Figure 3A:
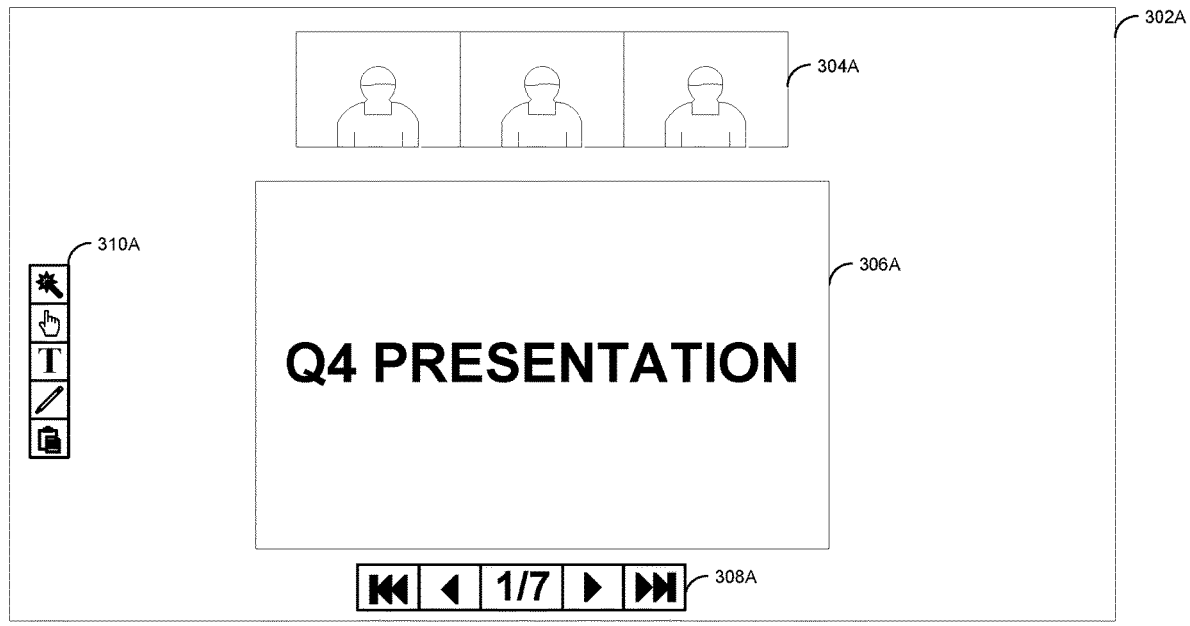
FIGS. 3A-3D illustrate example graphical user interfaces that are output by computing devices taking part in an online meeting.
Figure 3A:
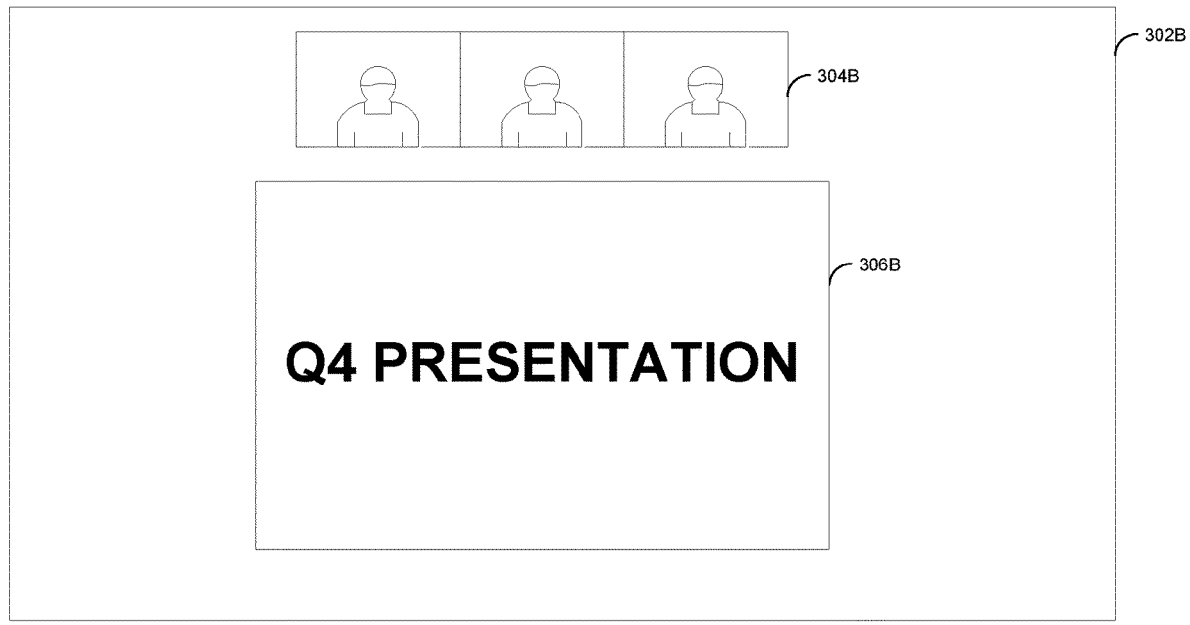

FIGS. 3A-3D illustrate example graphical user interfaces that are output by computing devices taking part in an online meeting. As shown in FIG. 3A, graphical user interface (GUI) 302A may be the user interface for online meeting application 208A during the online meeting between computing devices 110A and 110B, and computing device 110A may output GUI 302A for display at output device 218A. Similarly, GUI 302B may be the user interface for online meeting application 208B during an online meeting between computing devices 110A and 110B, and computing device 110B may output GUI 302B for display at output device 218A.

During the online meeting, if the online meeting is a video conference, GUIs 302A and 302B may include video 304A and 304B of the users of computing devices 110A and 110B taking part in the online meeting. GUIs 302A and 302B may also include presentation area 306A and 306B for outputting portions of the content that is shared during the online meeting. In the example of FIG. 3A, the content being shared is a slide deck.

Because computing device 110A is a presenting computer device for the online meeting, GUI 302A may include navigation controls 308A and markup controls 310A that the user of computing device 110A may use to interact with the content presented in presentation area 306A. Navigation controls 308A may enable the user of computing device 110A to navigate through the content. For example, when the content is a slide deck, navigation controls 308 may enable the user to navigate to the first slide, the last slide, the next slide, the previous side, or to any arbitrary slide in the slide deck. Markup controls 310A may enable the user of computing device 110A to mark up or annotate the content. For example, markup controls 310A may enable the user to draw on the content, insert textual comments, point to specific parts of the content, and the like.

Online meeting module 140 may synchronize the presentation of content during an online meeting, so that each of the computing devices taking part in an online meeting outputs the same representation of the content, thereby enabling the users of the computing devices to see the same portions of content and the same markups and/or annotations of the content at any given time. In the example of FIG. 3A, presentation areas 306A and 306B may each be showing the same slide: the first slide of the slide deck having the header "Q4 PRESENTATION".

Figure 3B:
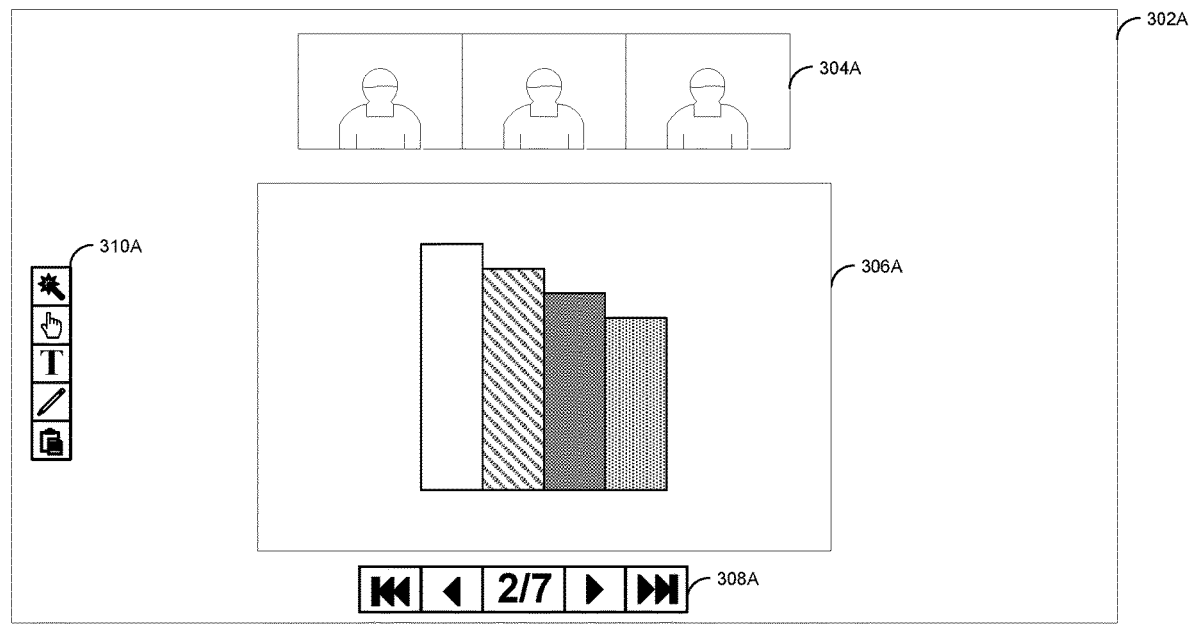
Figure 3B:
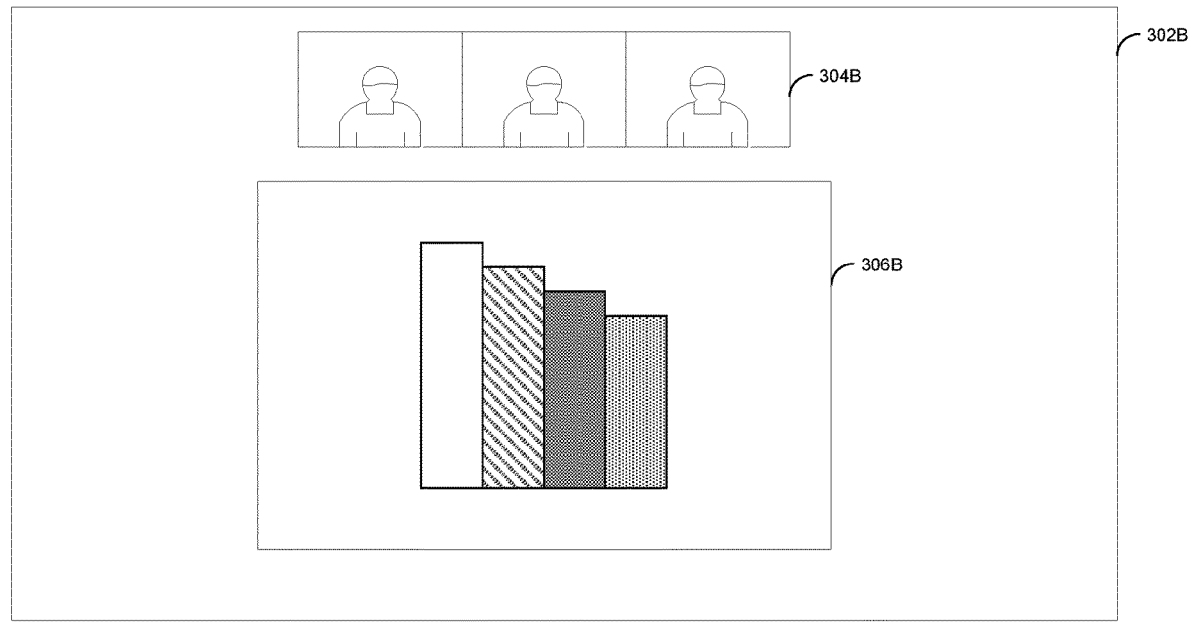

The user of computing device 110A may use navigation controls 308A and markup controls 310A to interact with the content being shared in the online meeting. As shown in FIG. 3B, the user of computing device 110A has interacted with navigation controls 308A to advance the slide deck to the second slide of the presentation, so that presentation area 306B now presents the second slide of the slide deck. In response, computing device 110A may send an indication that it has advanced the slide deck to slide two to online meeting system 130.

Online meeting system 130 may receive the indication that computing device 110A has advanced the slide deck to slide two and may formulate one or more commands to advance the slide deck to slide two. Online meeting system 130 may send the one or more commands to computing device 110B to direct computing device 110B to also advance the slide deck to slide two in order to synchronize the presentation of the content in presentation area 306B with the presentation of the content in presentation area 306A. Computing device 110B may receive the one or more commands from online meeting system 130 and may update its presentation of the content according to the one or more commands so that, as shown in FIG. 3B, presentation area 306B now presents the second slide of the slide deck.

Figure 3C:
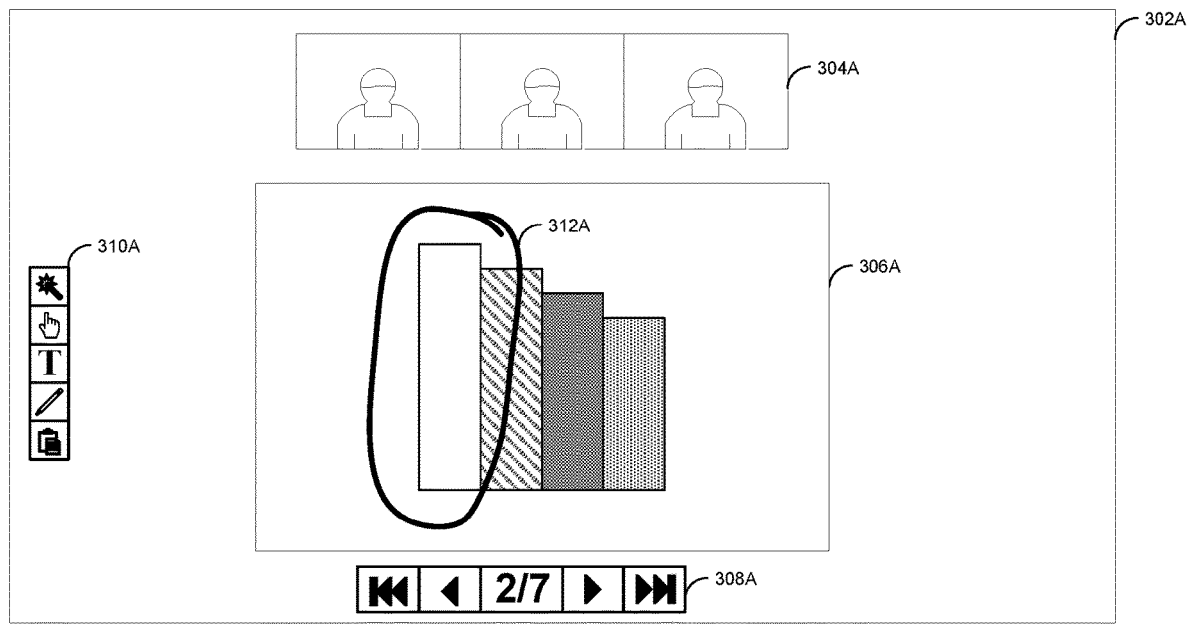
Figure 3C:
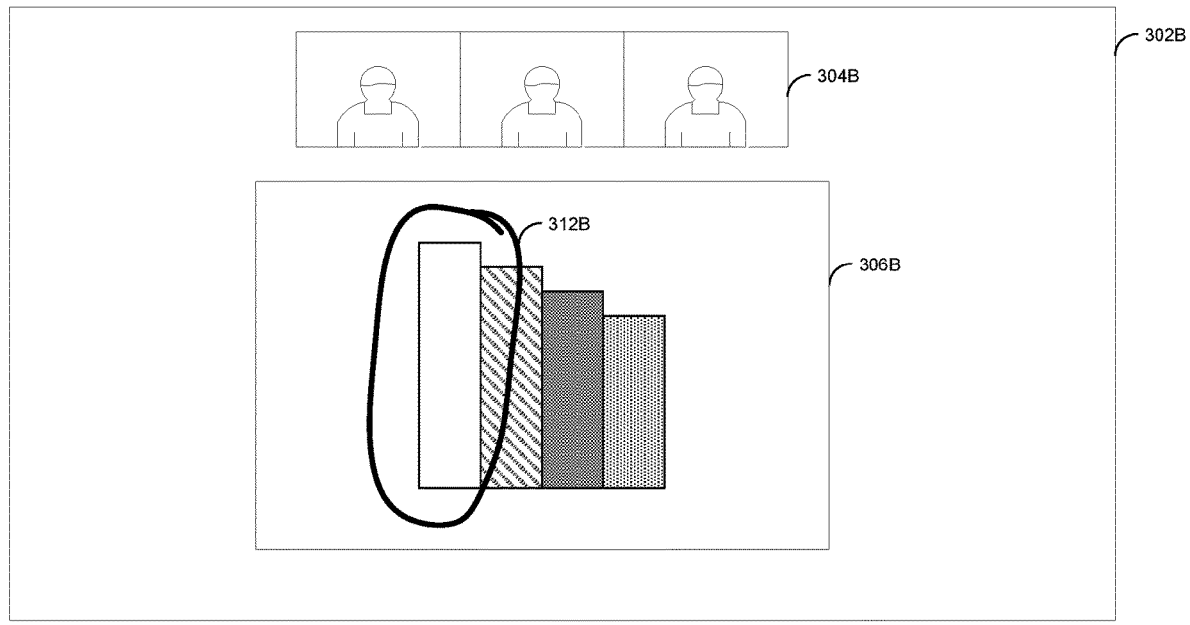

As shown in FIG. 3C, the user of computing device 110A may use markup controls 310A to markup or annotate the portion of the content presented in presentation area 306A. For example, the user of computing device 110A may use markup controls 310A to draw markup 312A on the second slide of the slide deck that is being presented in presentation area 306A. In response, computing device 110A may send an indication that it has marked up slide two of the slide deck with markup 312A to online meeting system 130.

Online meeting system 130 may receive the indication that computing device 110A has marked up slide two of the slide deck with markup 312A and may formulate one or more commands to mark up slide two of the slide deck with markup that corresponds to markup 312A. Online meeting system 130 may send the one or more commands to computing device 110B to direct computing device 110B to also mark up slide two of the slide deck with markup that corresponds to markup 312A in order to synchronize the presentation of the content in presentation area 306B with the presentation of the content in presentation area 306A. Computing device 110B may receive the one or more commands from online meeting system 130 and may update its presentation of the content according to the one or more commands so that, as shown in FIG. 3B, slide two of the slide deck as presented in presentation area 306B is marked up with markup 312B that corresponds to markup 312A.

An online meeting may not be limited to having only a single computing device be the presenter of content shared in the online meeting. Instead, two or more computing devices taking part in an online meeting may be presenters of content shared in the online meeting. In some examples, computing devices may present different portions of content, so that a first computing device may be the presenter for a first portion of the content and a second computing device may be the presenter for a second portion of the content.

Figure 3D:
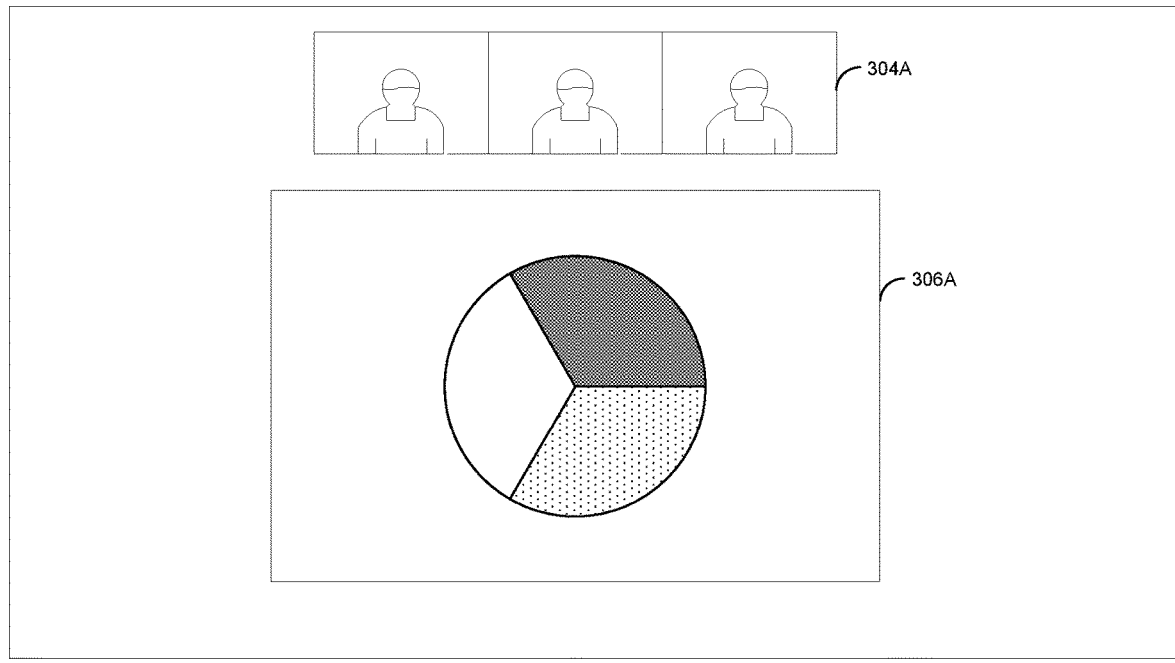
Figure 3D:
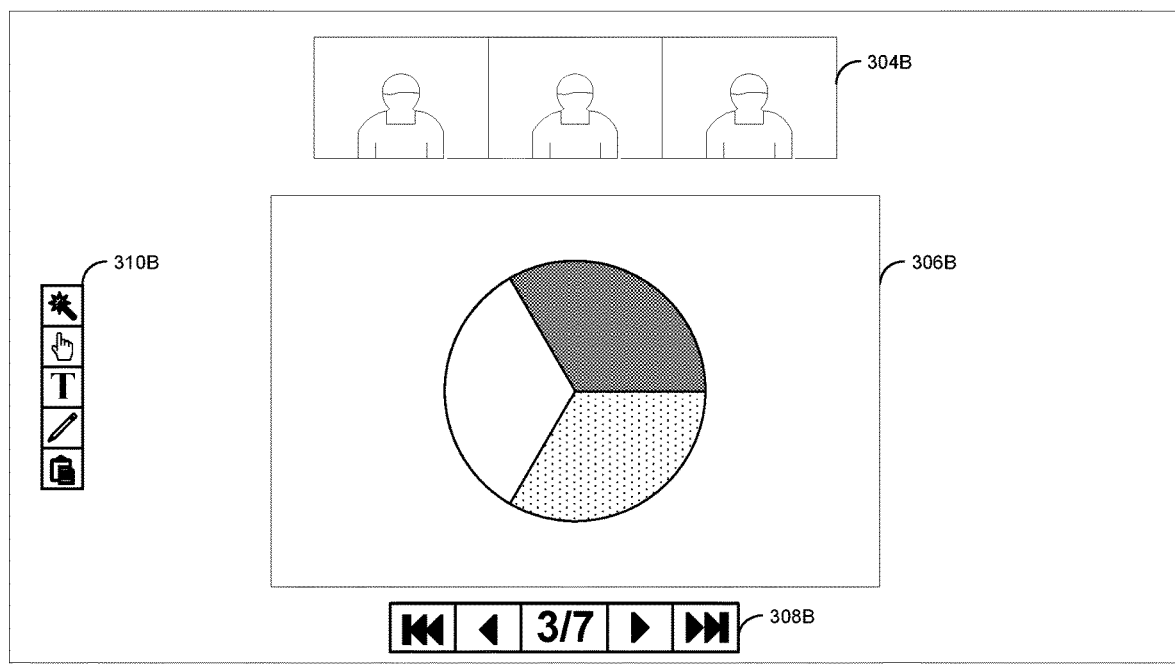

As shown in FIG. 3D, the user of computing device 110A has advanced the slide deck to a third slide, and correspondingly computing device 110B has also advanced the slide deck to the third slide. While computing device 110A is associated with a presenter role for the first two slides of the slide deck, computing device 110B may be associated with the presenter role for the third slide of the slide deck. Thus, computing device 110B may enable its user to act as the presenter when the slide deck is advanced to the third slide. For example, GUI 302B output by computing device 110B now includes navigation controls 308B and markup controls 310B that the user of computing device 110B may access to control navigation of the slide deck and to markup the third slide of the slide deck being presented in presentation area 306B. In this way, different computing devices taking part in an online meeting may act as presenters for different portions of content being shared in the online meeting.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
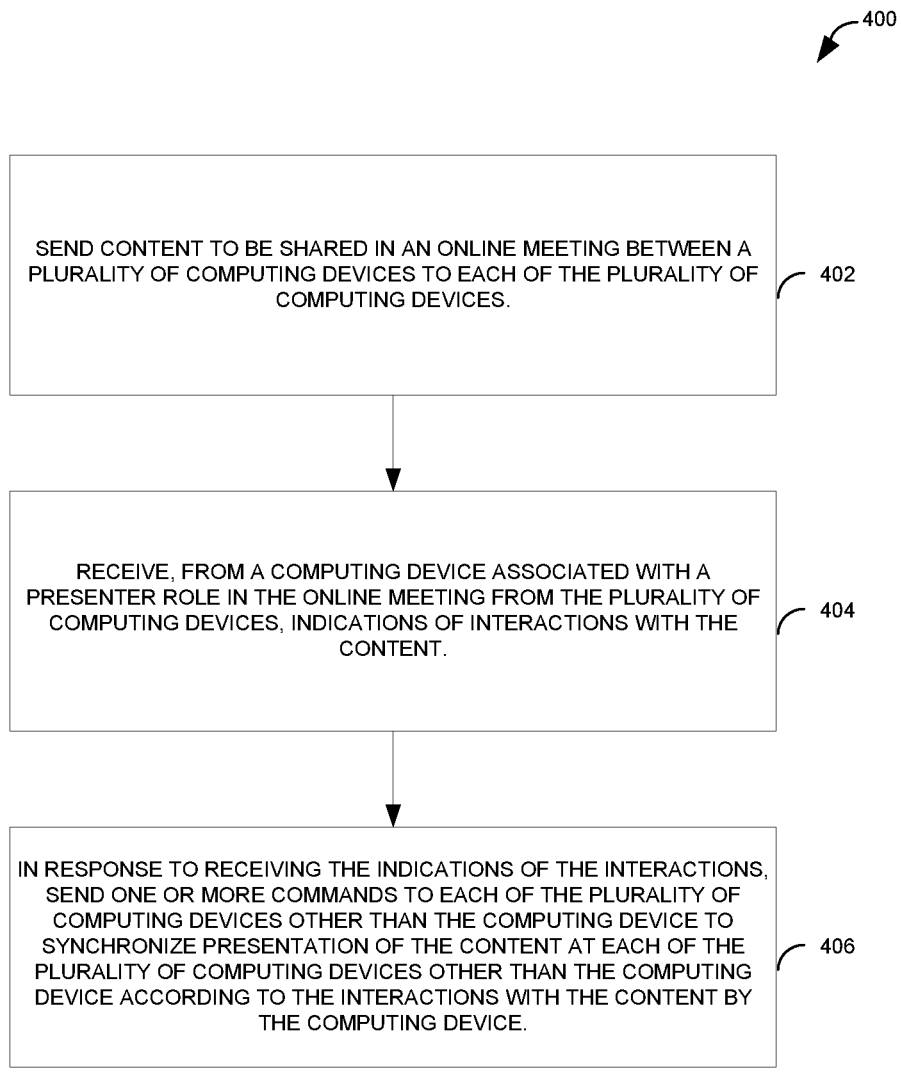
FIG. 4 illustrates an example process for sharing content in an online meeting using the example architecture of FIGS. 1 and 2.

FIG. 4 illustrates an example process 400 for sharing content in an online meeting using the example architectures of FIGS. 1 and 2. While FIG. 4 is described with reference to FIGS. 1 and 2, it should be noted that the process steps of FIG. 4 may be performed by other systems.

Process 400 includes online meeting system 130 sending content to be shared in an online meeting between a plurality of computing devices 110 to each of the plurality of computing devices 110 (402).

Process 400 further includes online meeting system 130 receiving, from a computing device 110A associated with a presenter role in the online meeting from the plurality of computing devices 110, indications of interactions with the content (404).

Process 400 further includes online meeting system 130, in response to receiving the indications of the interactions, sending one or more commands to each of the plurality of computing devices 110 other than the computing device 110A to synchronize presentation of the content at each of the plurality of computing devices 110 other than the computing device according to the interactions with the content by the computing device 110A (406)

In some examples, process 400 further includes online meeting system 130 converting the content from a first format to a second format, where sending the content to each of the plurality of computing devices 110 comprises sending the content in the second format to each of the plurality of computing devices 110. In some examples, the second format is a vector-based format, and converting the content from the first format to the second format comprises converting the content into the vector-based format.

In some examples, process 400 further includes online meeting system 130 receiving an indication of the content from the computing device 110A and retrieving the content based at least in part on the indication of the content. In some examples, online meeting system 130 retrieving the content based at least in part on the indication of the content may further include online meeting system 130 retrieving the content from a cloud-based data storage provider such as content storage system 120 based at least in part on the indication of the content.

In some examples, the interactions by the computing device 110A with the content include navigating from presenting a first portion of the content to presenting a second portion of the content, and the one or more commands include one or more commands to present the second portion of the content.

In some examples, the interactions by the computing device 110A with the content include marking up a portion of the content being presented in the online meeting, and the one or more commands include one or more commands to mark up the portion of the content.

In some examples, the computing device 110A comprises a first computing device, wherein the interactions with the content comprise first interactions with the content, and wherein the one or more commands comprise a first one or more commands, and process 400 may further include online meeting system 130 determining that a second computing device 110B from the plurality of computing devices 110 is associated with the presenter role. Process 400 may further include online meeting system 130 receiving, from the second computing device 110B, indications of second interactions with the content. Process 400 may further include online meeting system 130, in response to receiving the indications of the second interactions, sending a second one or more commands to each of the plurality of computing devices 110 other than the second computing device 110B to synchronize presentation of the content at each of the plurality of computing devices 110 other than the second computing device 110B according to the second interactions with the content by the second computing device 110B. In some examples, process 400 may further include online meeting system 130 determining that the second computing device 110B of the plurality of computing devices 110 is associated with the presenter role in response to a transition from a first portion of the content being presented in in the online meeting to a second portion of the content being presented in the online meeting.

In some examples, the online meeting comprises one of: a teleconference between the plurality of computing devices 110 or a video conference between the plurality of computing devices 110.

FIG. 4 set forth an example process 400 for sharing content in an online meeting using the example architectures of FIGS. 1 and 2. An example will now be described using the example process 400 of FIG. 4 The process 400 begins by proceeding to step 402, where a user of a first computing device 110A may interact with a file browsing user interface provided by a cloud storage provider, such as content storage system 120, to select a document to be shared in the online meeting. Content storage system 120 may send a universal resource locator (URL) for the document to online meeting system 130, and online meeting system 130 may retrieve the document from content storage system 120 via the URL. In response to retrieving the document, online meeting system 130 may send a copy of the retrieved document to each of the computing devices 110A and 110B taking part in the online meeting.

The process 400 proceeds to step 404, where the user of first computing device 110A may present the document. Online meeting application 208A may open the document and first computing device 110A may output the document for display at output device 218A The user may use input device 216A to provide user input to interact with the document, including navigating through the document, such as by scrolling through the document via a mouse or trackpad, or marking up the document via the mark up tools provided by online meeting application 208A.

The online meeting application 208A may send indications of the user's interactions with the document to online meeting system 130. For example, online meeting application 208A may send indications of the state of the document as is output by first computing device 110A for display at output device 218A. For example if the user scrolls the document from a first page to a second page, online meeting application 208A may send an indication that the user has scrolled the document from the first page to the second page. Similarly, if the user marks up a third page of the document, online meeting application may send an indication of the mark ups made to the third page of the document.

The process 400 proceeds to step 406, where online meeting system 130 may generate one or more commands based on the indications of the user's interactions with the document that it receives from first computing device 110A. For example, if the indications of the user's interactions include an indication that the user has scrolled the document from the first page to the second page, online meeting system 130 may generate one or more commands to scroll the document from the first page to the second page. Similarly, if the indications of the user's interactions include an indication of the mark ups made to the third page of the document, online meeting system 130 may generate one or more commands to mark up the third page of the document according to the markups made by the user to the third page of the document.

Online meeting system 130 may send the one or more commands to each of the computing devices taking part in the online meeting other than the first computing device 110A. Thus, online meeting system 130 may send the one or more commands to second computing device 110B, and second computing device 110B may execute the one or more commands to synchronize the presentation of the content at second computing device 110B according to the user's interactions with the document at computing device 110A. For example, second computing device 110B may execute the one or more commands to navigate the portion of the document that is output for display at output device 218B from the first page of the document to the second page of the document. Similarly, second computing device 110B may execute the one or more commands to mark up the third page of the document according to the markups made by the user to the third page of the document.

Hardware Overview

Figure 5:
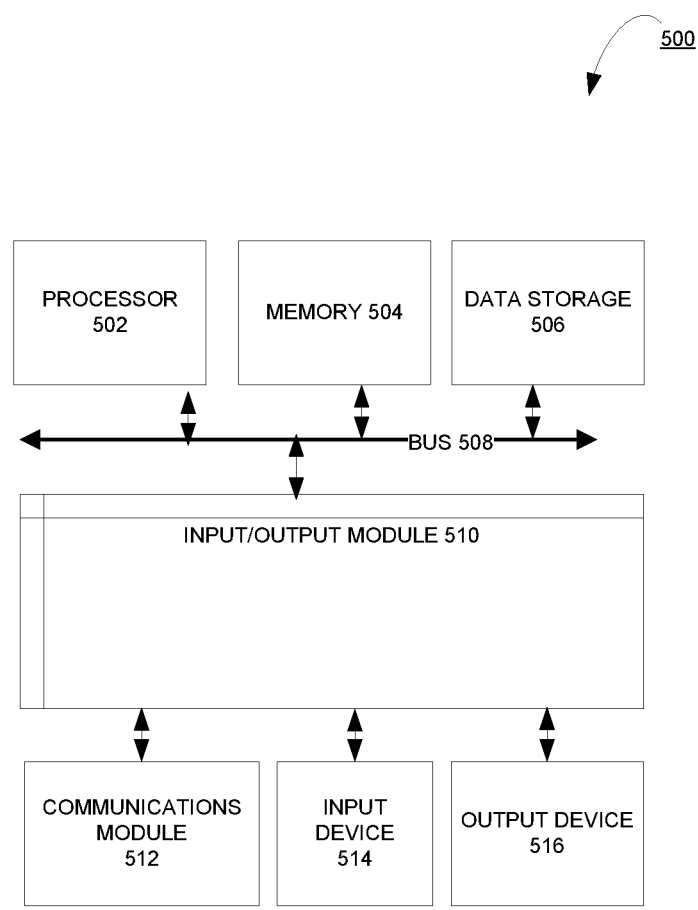
FIG. 5 is a block diagram illustrating an example computer system with which the computing devices and online meeting system of FIGS. 1 and 2 can be implemented.

FIG. 5 is a block diagram illustrating an example computer system 500 with which computing devices 110 and online meeting system 130 of FIGS. 1 and 2 can be implemented. In certain aspects, the computer system 500 may be implemented using hardware or a combination of software and hardware, either in a dedicated server, or integrated into another entity, or distributed across multiple entities.

Computer system 500 (e.g., computing devices 110 and online meeting system 130) includes a bus 508 or other communication mechanism for communicating information, and a processor 502 (e.g., processor 134, processor 204A, and processor 204B) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 132, memory 202A, and memory 202B), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages.

Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input devices 216A and 216B and output devices 218A and 218B). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communications module 136, communication module 206A, and communication module 206B) include networking interface cards, such as Ethernet cards and modems.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216A and input device 216B) and/or an output device 516 (e.g., output device 218A and output device 218B). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, computing devices 110 and online meeting system 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method for sharing content in an online meeting, the method comprising:
    converting content to be shared in an online meeting between a plurality of computing devices to a format that is optimized for sharing;
    sending the content to each of the plurality of computing devices, each of the plurality of computing devices receiving a copy of the content;
    outputting the copy of the content locally at each of the plurality of computing devices simultaneously;
    storing the copy of the content locally at each of the plurality of computing devices simultaneously;
    associating a presenter role with one or more of the plurality of computing devices;
    receiving, from a first computing device associated with the presenter role in the online meeting from the plurality of computing devices, indications of first interactions with the content through markup controls of the presenter role;
    in response to receiving the indications of the first interactions, sending a first one or more commands to each of the plurality of computing devices other than the first computing device to synchronize presentation of the content at each of the plurality of computing devices other than the first computing device according to the first interactions with the content by the first computing device;
    associating a second computing device from the plurality of computing devices with the presenter role;
    receiving, from the second computing device, indications of second interactions with the content, the indications of the second interactions comprising at least scrolling through the content by the second computing device; and in response to receiving the indications of the second interactions, sending a second one or more commands to each of the plurality of computing devices other than the second computing device to synchronize presentation of the content at each of the plurality of computing devices other than the second computing device according to the second interactions with the content by the second computing device.

2. The method of claim 1, further comprising:
converting the content from a first format to a second format, wherein sending the content to each of the plurality of computing devices comprises sending the content in the second format to each of the plurality of computing devices.

3. The method of claim 2, wherein:
the second format is a vector-based format; and
converting the content from the first format to the second format comprises converting the content into the vector-based format.

4. The method of claim 1, further comprising:
receiving an indication of the content from the computing device; and
retrieving the content based at least in part on the indication of the content.

5. The method of claim 4, wherein retrieving the content based at least in part on the indication of the content further comprises:
retrieving the content from a cloud-based data storage provider based at least in part on the indication of the content.

6. The method of claim 1, wherein:
the interactions by the computing device with the content include navigating from presenting a first portion of the content to presenting a second portion of the content; and
the one or more commands include one or more commands to present the second portion of the content.

7. The method of claim 1, wherein:
the interactions by the computing device with the content include marking up a portion of the content being presented in the online meeting; and
the one or more commands include one or more commands to mark up the portion of the content.

8. The method of claim 1, wherein: determining that the second computing device of the plurality of computing devices is associated with the presenter role is in response to a transition from a first portion of the content being presented in the online meeting to a second portion of the content being presented in the online meeting.

9. The method of claim 1, wherein the online meeting comprises one of: a teleconference between the plurality of computing devices or a video conference between the plurality of computing devices.

10. A system for sharing content in an online meeting:
a memory comprising content to be shared in an online meeting between a plurality of computing devices; and
a processor configured to execute instructions which, when executed, cause the processor to:
convert the content to a format that is optimized for sharing;
send the content to each of the plurality of computing devices, each of the plurality of computing devices receiving a copy of the content;
output the copy of the content locally at each of the plurality of computing devices simultaneously;
store the copy of the content locally at each of the plurality of computing devices simultaneously;
associate a presenter role with one or more of the plurality of computing devices;
receive, from a first computing device associated with the presenter role in the online meeting from the plurality of computing devices, indications of first interactions with the content through markup controls of the presenter role;
in response to receiving the indications of the first interactions, sending a first one or more commands to each of the plurality of computing devices other than the first computing device to synchronize presentation of the content at each of the plurality of computing devices other than the first computing device according to the first interactions with the content by the first computing device;
associate a second computing device from the plurality of computing devices with the presenter role;
receive, from the second computing device, indications of second interactions with the content, the indications of the second interactions comprising at least scrolling through the content by the second computing device; and
in response to receiving the indications of the second interactions, sending a second one or more commands to each of the plurality of computing devices other than the second computing device to synchronize presentation of the content at each of the plurality of computing devices other than the second computing device according to the second interactions with the content by the second computing device.

11. The system of claim 10, wherein the processor is further configured to execute instructions which, when executed, cause the processor to:
convert the content from a first format to a second format; and
send the content in the second format to each of the plurality of computing devices.

12. The system of claim 11, wherein:
the second format is a vector-based format; and
the instructions which, when executed, cause the processor to convert the content from the first format to the second format further cause the processor to convert the content into the vector-based format.

13. The system of claim 10, wherein the processor is further configured to execute instructions which, when executed, cause the processor to:
receive an indication of the content from the computing device; and
retrieve the content based at least in part on the indication of the content.

14. The system of claim 13, wherein the instructions which, when executed, cause the processor to retrieve the content based at least in part on the indication of the content further causes the processor to:
retrieve the content from a cloud-based data storage provider based at least in part on the indication of the content.

15. The system of claim 10, wherein:
the interactions by the computing device with the content include navigating from presenting a first portion of the content to presenting a second portion of the content; and
the one or more commands include one or more commands to present the second portion of the content.

16. The system of claim 10, wherein:
- the interactions by the computing device with the content include marking up a portion of the content being presented in the online meeting; and
- the one or more commands include one or more commands to mark up the portion of the content.

17. The system of claim 10, wherein the processor is further configured to execute instructions which, when executed, cause the processor to: determine that the second computing device of the plurality of computing devices is associated with the presenter role in response to a transition from a first portion of the content being presented in in the online meeting to a second portion of the content being presented in the online meeting.

18. A non-transitory machine-readable storage medium comprising machine-readable instructions for causing a processor to execute a method for sharing content in an online meeting, comprising:
- converting content to be shared in an online meeting between a plurality of computing devices to a format that is optimized for sharing;
- sending the content to each of the plurality of computing devices, each of the plurality of computing devices receiving a copy of the content;
- outputting the copy of the content locally at each of the plurality of computing devices simultaneously;
- storing the copy of the content locally at each of the plurality of computing devices simultaneously;
- associating a presenter role with one or more of the plurality of computing devices;
- receiving, from a first computing device associated with the presenter role in the online meeting from the plurality of computing devices, indications of first interactions with the content through markup controls of the presenter role;
- in response to receiving the indications of the first interactions, sending a first one or more commands to each of the plurality of computing devices other than the first computing device to synchronize presentation of the content at each of the plurality of computing devices other than the first computing device according to the first interactions with the content by the first computing device;
- associating a second computing device from the plurality of computing devices with the presenter role;
- receiving, from the second computing device, indications of second interactions with the content, the indications of the second interactions comprising at least scrolling through the content by the second computing device; and
- in response to receiving the indications of the second interactions, sending a second one or more commands to each of the plurality of computing devices other than the second computing device to synchronize presentation of the content at each of the plurality of computing devices other than the second computing device according to the second interactions with the content by the second computing device.

* * * * *